United States Patent
Mezzadri et al.

[11] Patent Number: 5,927,789
[45] Date of Patent: Jul. 27, 1999

[54] SEAT ASSEMBLY

[75] Inventors: Robert J. Mezzadri, Livonia; Thomas M. Frusti, Canton, both of Mich.

[73] Assignee: Ford Global Technologies, Inc., Dearborn, Mich.

[21] Appl. No.: 09/184,135

[22] Filed: Nov. 2, 1998

[51] Int. Cl.[6] .................................................. B60N 2/06
[52] U.S. Cl. ............................................ 296/64; 296/65.11
[58] Field of Search .................................. 296/64, 65.11, 296/65.12

[56] References Cited

U.S. PATENT DOCUMENTS

| | | |
|---|---|---|
| 1,471,001 | 10/1923 | Nicholson . |
| 2,297,176 | 9/1942 | Thompson .............................. 296/64 |
| 2,858,877 | 12/1958 | Krause . |
| 3,637,253 | 1/1972 | Maule et al. . |
| 4,595,164 | 6/1986 | Froutzis et al. . |
| 5,630,638 | 5/1997 | Hirasawa et al. . |
| 5,636,884 | 6/1997 | Ladetto et al. ........................ 296/65.11 |
| 5,769,480 | 6/1998 | Gebhardt .............................. 296/65.12 |

FOREIGN PATENT DOCUMENTS

| | | | |
|---|---|---|---|
| 361037547 | 2/1986 | Japan .................................. 296/65.11 |
| 61-24632 | 2/1986 | Japan . |
| 40195948 | 4/1989 | Japan .................................. 296/65.11 |
| 1031434 | 6/1966 | United Kingdom . |

*Primary Examiner*—Gary C. Hoge
*Attorney, Agent, or Firm*—David B. Kelley, Esq

[57] ABSTRACT

A seat assembly for a motor vehicle includes a first row of seats, a second row of seats spaced from the first row of seats, a third row of seats spaced from the second row of seats, and the second row of seats slide laterally to allow ingress and egress to the third row of seats.

20 Claims, 3 Drawing Sheets

SEAT ASSEMBLY

BACKGROUND OF THE INVENTION

1. Field of the Invention

The present invention relates generally to seats for motor vehicles and, more specifically, to a seat assembly for a motor vehicle.

2. Description of the Related Art

It is known to provide a plurality or rows of seats for a motor vehicle. Typically, a motor vehicle such as a van or sports utility vehicle has a front or first row of seats and a rear or second row of seats. These types of motor vehicles may also include a third row of seats rearward of the second row of seats.

It is also known that the above motor vehicles may have at least one sliding door for ingress and egress of an occupant compartment of the motor vehicle. In some of these motor vehicles, a sliding door may be provided on both sides of the motor vehicle.

Although the above seat and sliding door arrangement for these motor vehicles have worked well, they suffer from the disadvantage that the rows of seats are fixed relative to the sliding doors and do not allow easy entry into the third row of seats when entering the occupant compartment. Another disadvantage is that the second row of seats is biased toward a left hand side of the motor vehicle and, when the left hand sliding door is used, there is no access to the third row of seats.

SUMMARY OF THE INVENTION

Accordingly, the present invention is a seat assembly for a motor vehicle including a first row of seats and a second row of seats spaced from the first row of seats. The seat assembly also includes a third row of seats spaced from the second row of seats. The second row of seats slide laterally to allow ingress and egress to the third row of seats.

One advantage of the present invention is that a seat assembly is provided for a motor vehicle. Another advantage of the present invention is that a seat assembly is provided that allows a second row of seats to move laterally in a motor vehicle such as a van or sports utility vehicle. Yet another advantage of the present invention is that a seat assembly is provided for motor vehicles with dual sliding doors which allows a second row of seats to move laterally from either side entryway to allow easy access to a third row of seats from either side of the motor vehicle. A further advantage of the present invention is that the seat assembly allows an existing underbody (floor tubs) to be maintained.

Other features and advantages of the present invention will be readily appreciated as the same becomes better understood after reading the subsequent description when taken in conjunction with the accompanying drawings.

DESCRIPTION OF THE PREFERRED EMBODIMENT(S)

Figure 1:
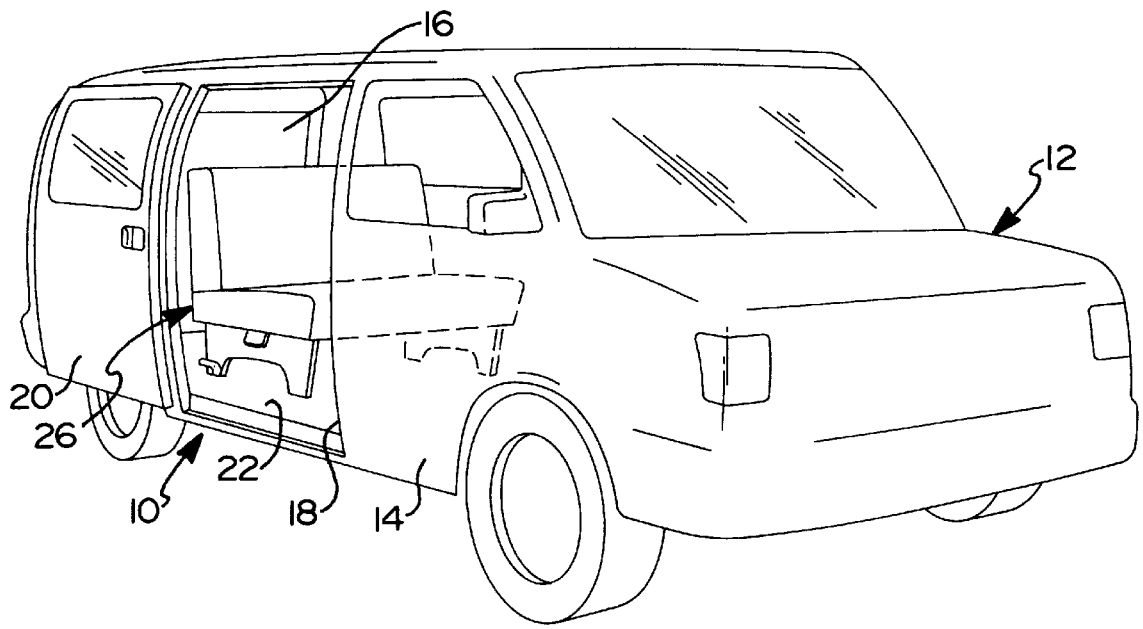
FIG. 1 is a perspective view of a seat assembly, according to the present invention, illustrated in operational relationship with a motor vehicle.
Figure 2:
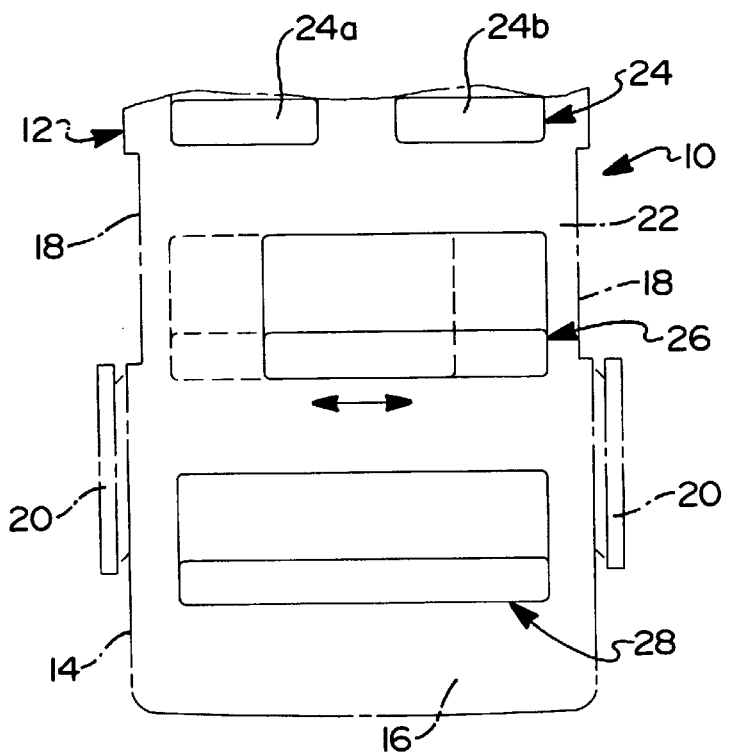
FIG. 2 is a plan view of the seat assembly and motor vehicle of FIG. 1.

Referring now to the drawings and in particular FIG. 1 and 2, one embodiment of a seat assembly 10, according to the present invention, is shown for a motor vehicle, generally indicated at 12. The motor vehicle 12 includes a body 14 forming an occupant compartment 16 and having at least one opening 18 on each side of the body 14. The motor vehicle 12 also includes at least one door 20 closing each opening 18. The door 20 is of a sliding type and is conventional and known in the art. The motor vehicle 12 further includes a floorpan 22 forming an underbody or floor of the occupant compartment 16. It should be appreciated that, except for the seat assembly 10, the motor vehicle 12 is conventional and known in the art.

The seat assembly 10 includes a first row of seats 24. The first row of seats 24 includes at least one, preferably a pair of first row seat assemblies 24a and 24b disposed longitudinally forward of the openings 18 and operatively connected to the floorpan 22 by suitable means such as fasteners (not shown). The seat assembly 10 also includes a second row of seats 26 spaced longitudinally from the first row of seats 24. The second row of seats 26 includes at least one second row seat assembly 26 of a bench type disposed adjacent the openings 18 and operatively connected to the floorpan 22 by suitable means to be described. The seat assembly 10 further includes a third row of seats 28 spaced longitudinally from the second row of seats 26. The third row of seats 28 includes at least one third row seat assembly 28 of a bench type disposed longitudinally rearward of the openings 18 and operatively connected to the floorpan by suitable means. It should be appreciated that the first row of seats 24 and third row of seats 28 are conventional and known in the art.

Figure 3:
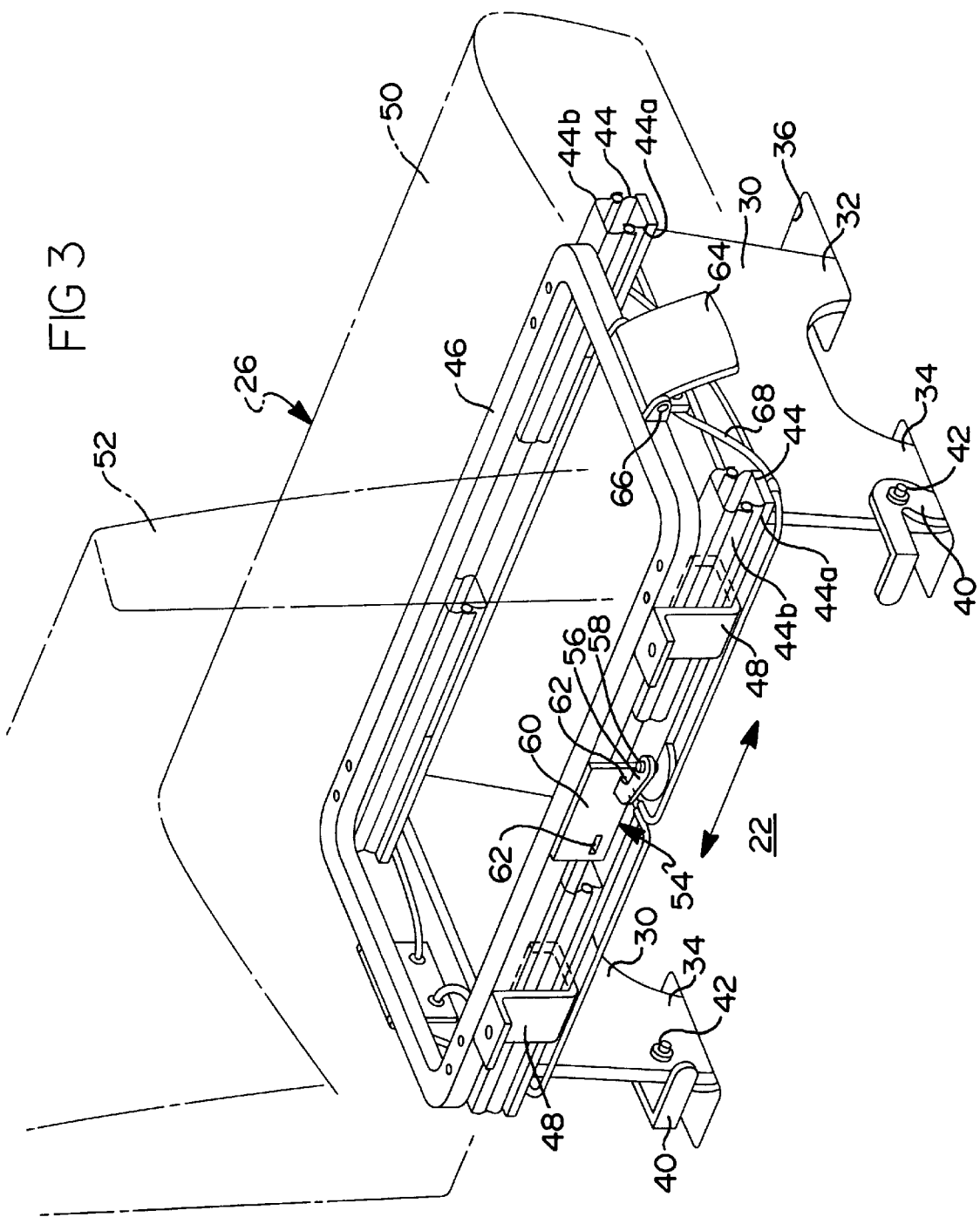
FIG. 3 is a perspective view of a second row seat assembly of the seat assembly of FIG. 2.

Referring to FIGS. 2 and 3, the second row seat assembly 26, according to the present invention, includes at least one, preferably a pair of laterally spaced seat support members 30. Each support member 30 is generally rectangular in shape and extends vertically and longitudinally. Each support member 30 is made of a rigid material, preferably a metal material. Each support member 30 has a forward foot portion 32 and a rearward foot portion 34. The forward foot portion 32 has a general "C" shape and is removably disposed in a cavity 36 in the floorpan 22 about a horizontal rod (not shown) disposed in the cavity 36. The rear foot portion 34 has a general "U" shape and is removably disposed in a cavity 38 in the floorpan 22 located rearwardly of the cavity 36. The rear foot portion 34 also has a latch member 40 pivotally connected thereto by suitable means such as a pin 42. The latch member 40 has a general "C" shape to pivotally engage a horizontal rod (not shown) in the cavity 38. It should be appreciated that the foot portions 32 and 34 are conventional and known in the art.

The second row seat assembly 26 also includes at least one, preferably a pair of tracks 44 connected to a top of the support members 30 by suitable means such as welding. The tracks 44 are spaced longitudinally and extend laterally. Each track 44 has a lower track member 44a fixedly secured to the support members 30 and an upper track member 44b which slidably engages the lower track member 44a for a function to be described. The track members 44a and 44b are made of a metal material and have a general "U" shape.

The second row seat assembly 26 further includes a seat frame 46. The seat frame 46 is generally rectangular in shape. The seat frame 46 is made of a rigid material, preferably a metal material. The seat frame 46 is a tubular member having a generally rectangular cross-sectional shape. The seat frame 46 is secured to the upper track member 44b by suitable means such as welding. It should be appreciated the seat frame 46 slides with the upper track member 44b relative to the lower track member 44a.

The second row seat assembly 26 includes at least one, preferably a pair of load transfer hooks 48 spaced laterally and connected to the seat frame 46 by suitable means such as welding. Each load transfer hook 48 has a general "L" shape and is disposed about the rear lower track member 44a. The load transfer hooks 48 move with the seat frame 46 relative to the lower track member 44a.

The second row seat assembly 26 also includes a generally horizontal seat cushion 50 connected by suitable means such as fasteners (not shown) to the seat frame 46. The second row seat assembly 26 further includes a generally upright seat back 52 connected to the seat cushion 50 by suitable means such as fasteners (not shown). It should be appreciated that the seat cushion 50 and seat back 52 are conventional and known in the art.

The second row seat assembly 26 also includes a self-latching release mechanism, generally indicated at 54, to lock and unlock the seat frame 46 relative to the tracks 44. The release mechanism 54 includes a latch 56 pivotally connected by suitable means such as a pin 58 to the lower track member 44a and spring loaded by a spring (not shown) to a latching position. The release mechanism 54 also includes a latch plate 60 connected to the seat frame 46 by suitable means such as welding. The latch plate 60 has at least one, preferably a pair of apertures 62 extending therethrough and spaced laterally to provide a first position and a second position when engaged by the latch 58. The release mechanism 54 further includes a release handle 64 pivotally connected by suitable means such as a pin 66 to each lateral side of the seat frame 46. The release mechanism 54 further includes a cable 68 interconnecting each release handle 64 and latch 58. It should be appreciated that moving either the release handle 64 causes the latch 58 to engage or disengage the latch plate 60.

The second row seat assembly 26 may include a belt restraining system (not shown) connected to the load transfer hooks 48. Belt loading would be transferred to the support members 30 via the foot portions 32 and 34 which engage the floorpan 22.

Figure 4:
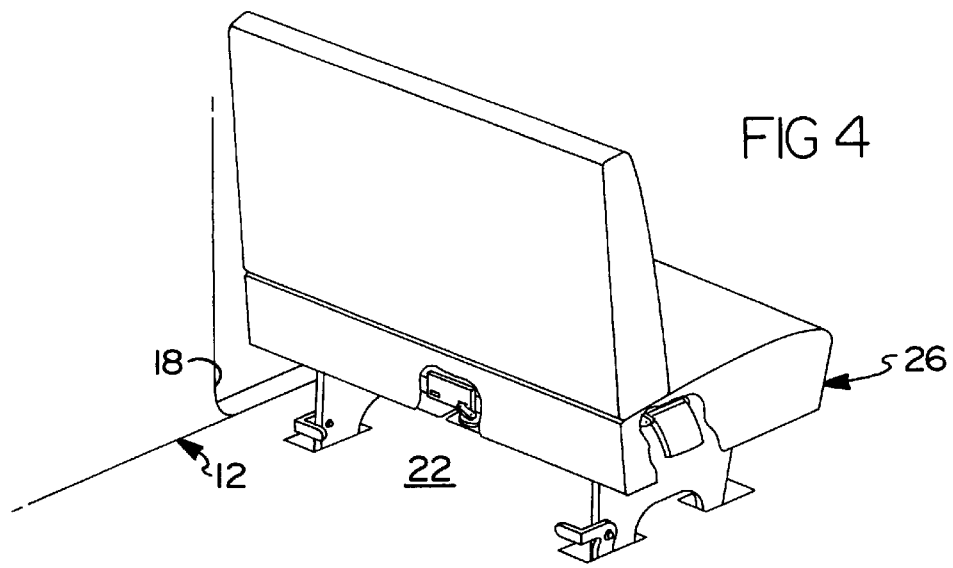
FIG. 4 is a perspective view of the second row seat assembly of the seat assembly of FIG. 2 illustrated in a first position.
Figure 5:
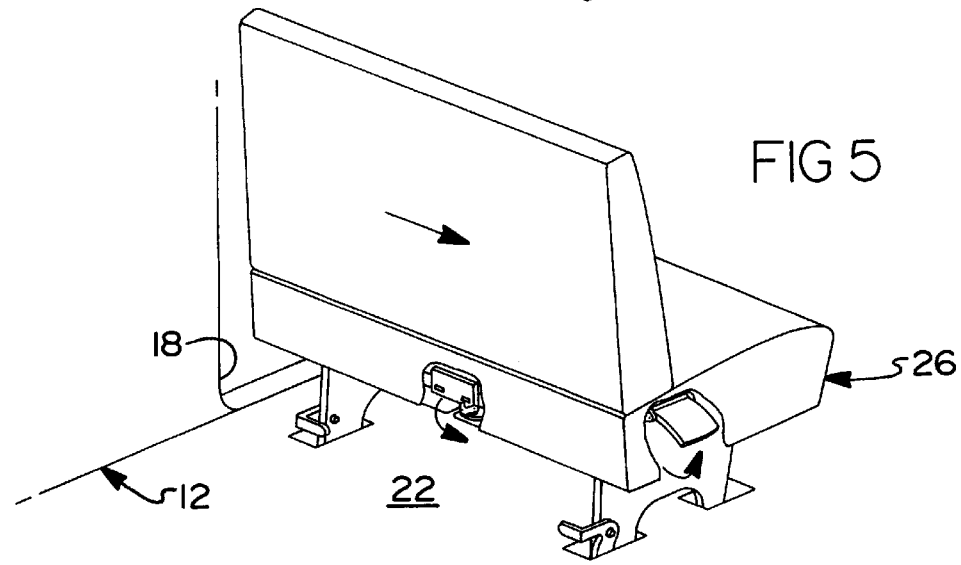
FIG. 5 is a view similar to FIG. 4 illustrating operation of the second row seat assembly.
Figure 6:
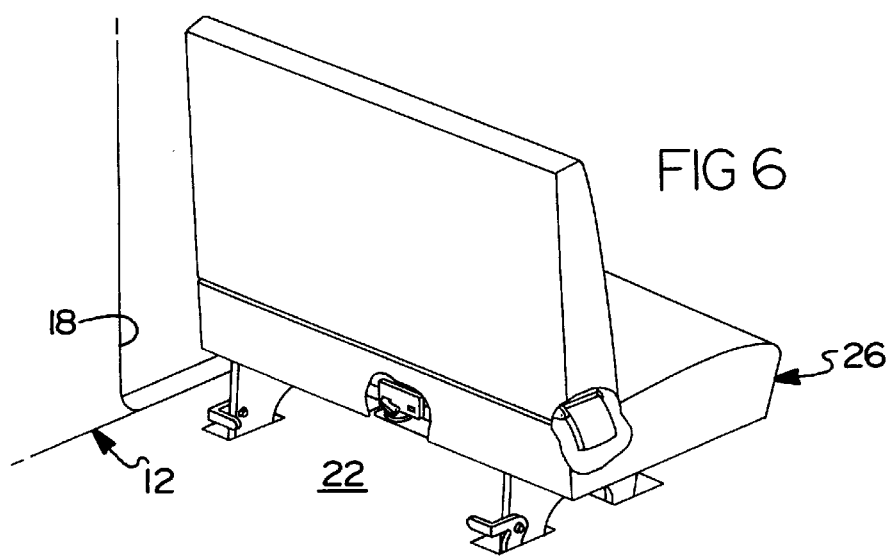
FIG. 6 is a view similar to FIG. 4 illustrating the second row seat assembly in a second position.

In operation, as illustrated in FIGS. 2 and 4, the second row seat assembly 26 is in a first position. An operator moves the release handle 64 on one side of the second row seat assembly 26 and disengages the latch 58 from the latch plate 60 as illustrated in FIG. 5. The operator moves the seat cushion 52 and seat back 54 laterally via the tracks 44 to a second position as illustrated in FIGS. 2 and 6. The operator releases the release handle 64 and the latch 58 engages the latch plate 60. It should be appreciated that the operation is repeated for moving the second row seat assembly 26 back to the first position.

Accordingly, the seat assembly 10 provides a second row seat assembly 26 that slides laterally in a motor vehicle 12 for ease of entry into the third row of seats 28. The second row seat assembly 26 includes a release handle 64 at both ends to aid in re-positioning of the seat cushion 52 and seat back 54 from either side opening 18 of the motor vehicle 12 to allow easy access to the third row of seats 28 from either side of the motor vehicle 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat assembly for a motor vehicle comprising:

a first row of seats;

a second row of seats spaced from said first row of seats;

a third row of seats spaced from said second row of seats; and wherein said second row of seats slides laterally to allow ingress and egress to said third row of seats.

2. A seat assembly as set forth in claim 1 wherein said second row of seats comprises at least one second row seat assembly.

3. A seat assembly as set forth in claim 2 wherein said at least one second row seat assembly includes at least one track to allow said second row seat assembly to slide.

4. A seat assembly as set forth in claim 3 wherein said at least one track comprises a lower track member and an upper track member slidable along said lower track member.

5. A seat assembly as set forth in claim 3 wherein said at least one second row seat assembly includes a seat cushion and a seat back operatively connected to said at least one track.

6. A seat assembly as set forth in claim 3 wherein said at least one second row seat assembly includes at least one support member removably connected to a floor of the motor vehicle, said at least one track being connected to said at least one support member.

7. A seat assembly as set forth in claim 6 wherein said at least one second row seat assembly includes at least one load transfer hook disposed about said at least one track for transferring loads to said at least one support member.

8. A seat assembly as set forth in claim 3 wherein said at least one second row seat assembly includes a release mechanism for locking and unlocking said second row seat assembly relative to said at least one track.

9. A seat assembly as set forth in claim 8 wherein said release mechanism comprises a latch, a latch plate and a release handle for moving said latch to engage and disengage said latch plate.

10. A seat assembly as se t forth in claim 2 wherein said at least one second row seat assembly is a bench seat.

11. A motor vehicle comprising:

a body having an opening on each lateral side thereof;

a sliding door operatively connected to said body on each lateral side to open and close said opening;

a first row of seats disposed forward of said opening;

a second row of seats spaced longitudinally from said first row of seats and disposed adjacent said opening;

a third row of seats spaced longitudinally from said second row of seats and disposed rearward of said opening; and wherein said second row of seats slide laterally to allow ingress and egress to said third row of seats.

12. A motor vehicle as set forth in claim 11 wherein said second row of seats comprises a second row seat assembly.

13. A motor vehicle as set forth in claim 12 wherein said second row seat assembly includes a pair of support members removably connected to a floor of said motor vehicle.

14. A motor vehicle as set forth in claim 13 wherein said second row seat assembly includes a pair of tracks spaced longitudinally and spaced laterally and connected to said support members.

15. A motor vehicle as set forth in claim 14 wherein said second row seat assembly includes a seat frame connected to said tracks.

16. A motor vehicle as set forth in claim 15 wherein said second row seat assembly includes a seat cushion and a seat back operatively connected to said seat frame.

17. A motor vehicle as set forth in claim 15 wherein said second row seat assembly includes a plurality of load transfer hooks connected to said seat frame and disposed about one of said tracks.

18. A motor vehicle comprising:

a body forming an occupant compartment having at least one opening on each side thereof;

a first row seat assembly disposed forward of said at least one opening;

a second row seat assembly spaced longitudinally of said first row seat assembly;

a third row seat assembly spaced longitudinally of said second row seat assembly and disposed rearward of said at least one opening; and said second row seat assembly including means for allowing said second row seat assembly to move laterally relative to said at least one opening.

19. A motor vehicle as set forth in claim 18 wherein said second row seat assembly comprises a seat portion extending generally horizontally and at least one support member operatively connected to said seat portion and a floor of said motor vehicle.

20. A motor vehicle as set forth in claim 18 wherein said means comprises at least one lower track member operatively connected to said at least one support member and at least one upper track member operatively connected to said seat portion and disposed about said at least one lower track member for sliding movement therealong.

* * * * *